(12) United States Patent
Campbell, Jr.

(10) Patent No.: US 8,122,793 B2
(45) Date of Patent: Feb. 28, 2012

(54) TOOL FOR ALIGNING WIND TURBINE TOWER FASTENERS

(75) Inventor: Wayne S. Campbell, Jr., Cleburne, TX (US)

(73) Assignee: Siemens Aktiengesellschaft, München (DE)

( * ) Notice: Subject to any disclaimer, the term of this patent is extended or adjusted under 35 U.S.C. 154(b) by 540 days.

(21) Appl. No.: 12/240,183

(22) Filed: Sep. 29, 2008

(65) Prior Publication Data

US 2010/0077696 A1    Apr. 1, 2010

(51) Int. Cl.
  *B25B 19/00*     (2006.01)
  *B25D 11/00*     (2006.01)
  *B23B 45/16*     (2006.01)
  *B25C 7/00*      (2006.01)

(52) U.S. Cl. ......... 81/463; 173/91; 173/133; 52/DIG. 1; 227/147

(58) Field of Classification Search ............... 52/745.17, 52/745.18, 745.2, DIG. 1; 173/90, 91, 128, 173/133; 254/131; 227/147; 81/463; 29/254, 29/275, 278
See application file for complete search history.

(56) References Cited

U.S. PATENT DOCUMENTS

| | | | | | |
|---|---|---|---|---|---|
| 840,580 | A | * | 1/1907 | McMillan | 7/144 |
| 4,261,424 | A | * | 4/1981 | Gonterman et al. | 173/91 |
| 4,466,188 | A | * | 8/1984 | Svendsgaard | 30/172 |
| 5,088,174 | A | * | 2/1992 | Hull et al. | 29/254 |
| 5,109,739 | A | | 5/1992 | Hull et al. | |
| 5,370,192 | A | * | 12/1994 | Evinger | 173/90 |
| 5,504,982 | A | * | 4/1996 | Sharp | 29/255 |
| 5,699,864 | A | * | 12/1997 | Dvorak et al. | 173/91 |
| 5,934,139 | A | * | 8/1999 | Tucker | 72/479 |
| 6,035,946 | A | * | 3/2000 | Studley et al. | 173/90 |
| 6,786,491 | B2 | * | 9/2004 | Carbonneau | 279/89 |
| 7,191,685 | B2 | * | 3/2007 | Lowther | 81/27 |
| D580,732 | S | * | 11/2008 | Meagher et al. | D8/107 |
| 2007/0029101 | A1 | | 2/2007 | Croas | |
| 2007/0181320 | A1 | * | 8/2007 | Mason | 173/90 |

* cited by examiner

*Primary Examiner* — Eileen D Lillis
*Assistant Examiner* — Ryan Kwiecinski

(57) ABSTRACT

A tool for aligning a wind turbine tower fastener includes a shaft having a first end and a second end. A first stop is disposed on the shaft proximate a first end of the shaft and a second stop is disposed on the shaft between the first end and the second end. The tool also includes a ram reciprocally movable about the shaft between the first stop and the second stop for applying a force to the first stop and the second stop respectively. The tool further includes a fastener engaging structure disposed proximate the second end for engaging at least a portion of a fastener and transferring the force applied by the ram to at least one of the first stop and the second stop effective to urge movement of the fastener responsive to the force for aiding alignment of the fastener.

10 Claims, 3 Drawing Sheets

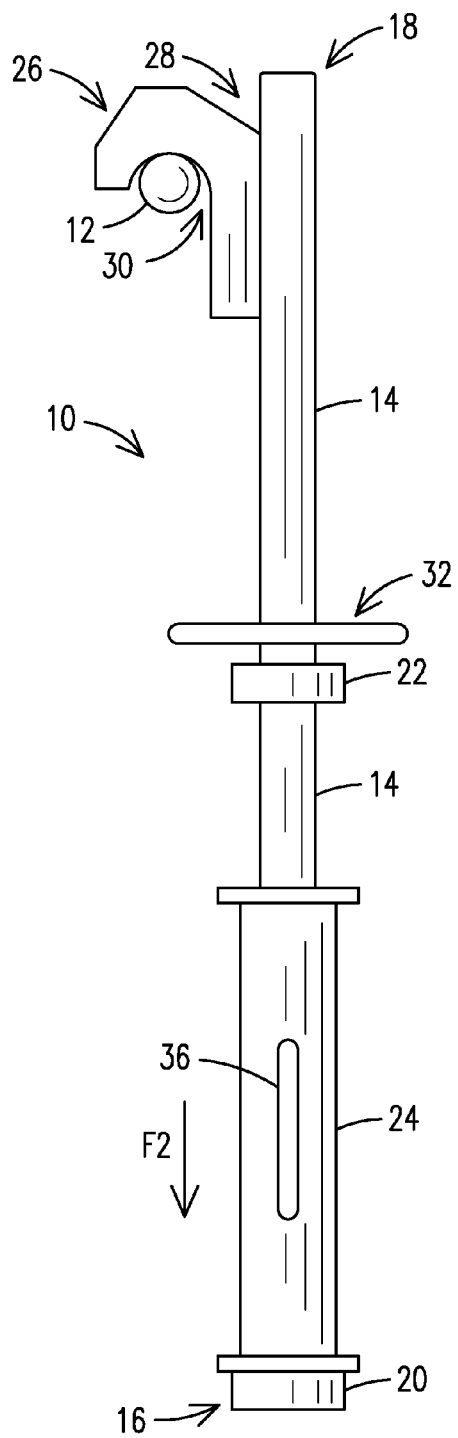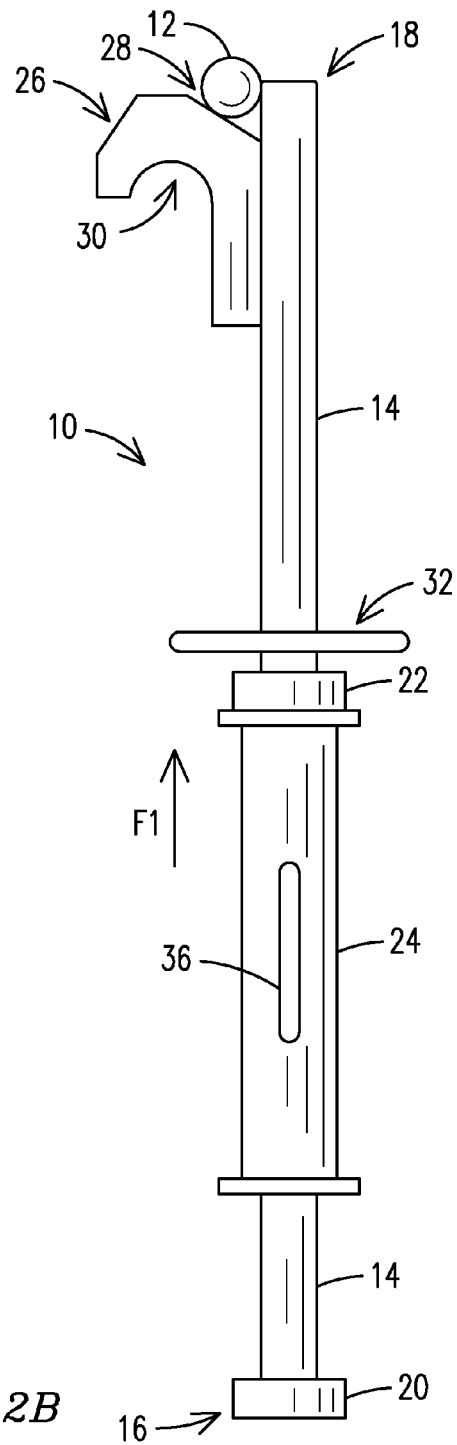
FIG. 2A
FIG. 2B

TOOL FOR ALIGNING WIND TURBINE TOWER FASTENERS

FIELD OF THE INVENTION

The present invention relates to wind turbines, and more particularly, to a method and tool for aligning fasteners with corresponding holes in a wind turbine tower base.

BACKGROUND OF THE INVENTION

Tower structures, such as a wind turbine towers, may be attached to a tower foundation by bolting a base of the tower to a fastener, such as an anchor bolt, secured in the tower foundation. In an exemplary erection method, anchor bolts may be embedded vertically in the foundation in a pattern to match a corresponding pattern of vertical holes in a base of the tower, such as in a flange portion of the base. The base may be vertically lowered over the foundation and positioned to align the anchor bolts protruding from the foundation with the holes in the flange. However, there may be some slight misalignment of the anchor bolts with respect to their corresponding holes. Such misalignments may require that the anchor bolts be urged into alignment with the holes so that the base of the tower can be lowered over the anchor bolts to rest on the foundation.

BRIEF DESCRIPTION OF THE DRAWINGS

The invention is explained in the following description in view of the drawings that show:

FIGS. 2A and 2B are top views of the tool of FIG. 1 positioned for urging the fastener in different directions, respectively.

DETAILED DESCRIPTION OF THE INVENTION

Figure 1:
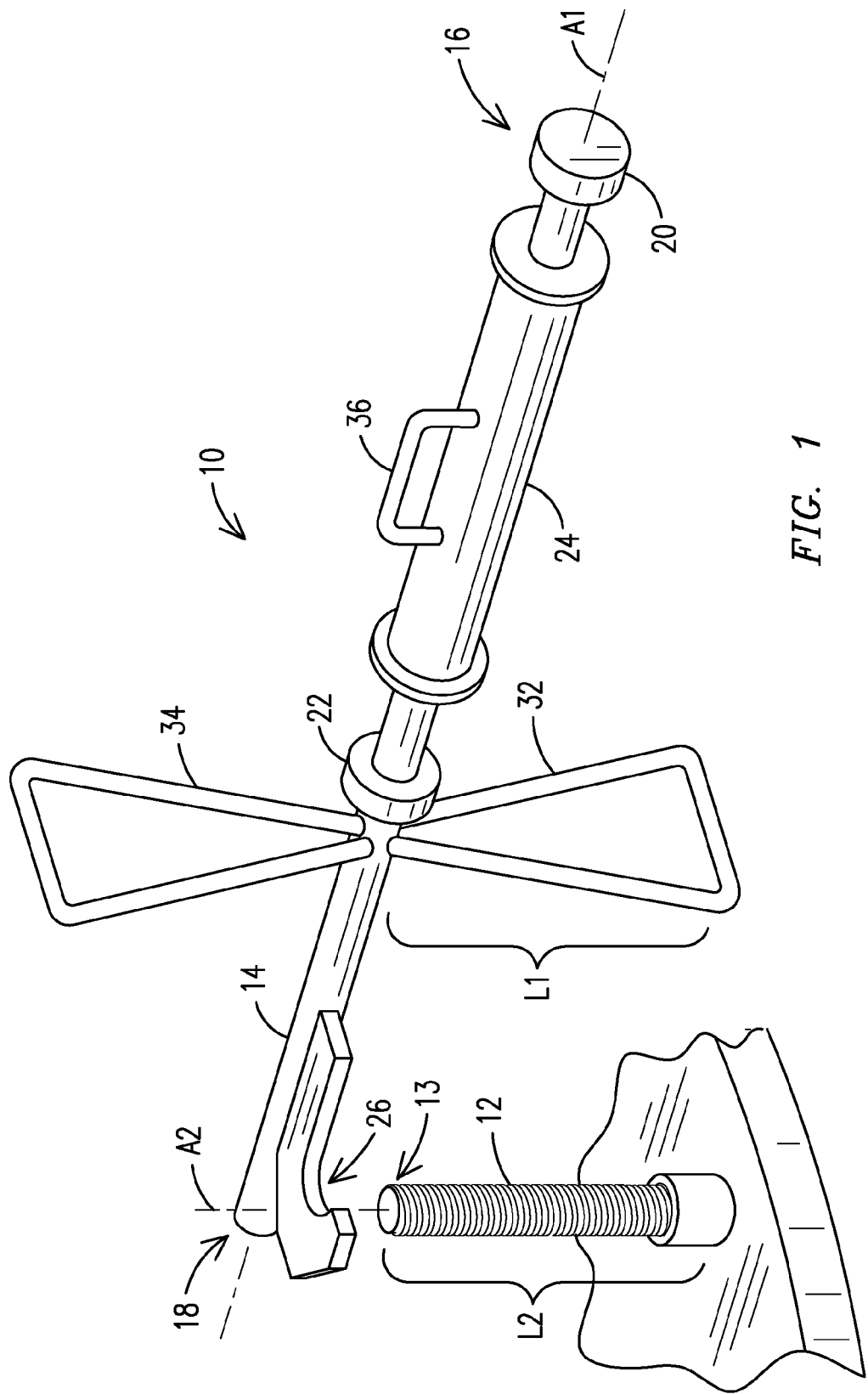
FIG. 1 is a perspective view of a tool for aligning a wind turbine tower fastener.

In an example embodiment of the invention shown in FIG. 1, a tool 10 for aligning a wind turbine tower fastener 12 includes a shaft 14 having a first end 16 and a second end 18. The fastener 12 may include an anchor bolt vertically retained in a foundation of the wind turbine tower. In an example embodiment, the shaft 14 may be formed from a metal rod and may have a circular cross section. The shaft 14 may include a first stop 20 disposed on the shaft 14 proximate a first end 16 of the shaft 14. The tool 10 may further include a ram 24 reciprocally movable about the shaft 14 between the first stop 20 and the second stop 22 for selectively applying a force to the first stop 20 and the second stop 22, respectively. In an example embodiment, the first stop 20 and/or the second stop 22 may include a metal ring formed with or attached to the shaft 14 so that the stops 20, 22 are sufficiently strong to withstand repeated collisions with the ram 24 being reciprocally moved about the shaft to contact respective stops 20, 22. The ram 24 may also include a ram handle 36 attached to the ram 24 for allowing a user to reciprocally move the ram between the first and second stops 20, 22.

As shown in FIGS. 2A and 2B, the tool 10 further includes a fastener engaging structure 26 disposed proximate the second end 18 for engaging at least a portion of the fastener 12. The fastener engaging structure 26 may be configured for transferring the force applied by the ram 24 to at least one of the first stop 20 and the second stop 22 effective to urge movement of the fastener 12 responsive to the force for aiding alignment of the fastener 12. In an example embodiment shown in FIG. 2B, the fastener engaging structure 26 may include a notch 28 sized to accommodate the portion of the fastener 12 for transferring force F1 applied to the second stop 22 by the ram 24 to the fastener 12. In an example embodiment shown in FIG. 2A, the fastener engaging structure 26 may include a hook 30 sized to accommodate the portion of the fastener 12 for transferring force F2 applied to the first stop 20 to the fastener 12. In an example embodiment, the fastener engaging structure 26 may be formed from a metal plate attached perpendicularly near the second end 18 of the shaft 14. The plate may include a trimmed corner that may form the notch 28, such as a triangular notch, with respect to the second end 18. The plate may also include a hook 30 formed therein as shown in FIGS. 2A and 2B. Other fastener engaging structure 26 configurations may be used, such as notches and/or hooked structures integrally formed in the shaft 14.

The tool 10 may further include a stand 32 attached to the shaft 14 between the second stop 22 and the second end 18 and extending substantially perpendicularly away from the shaft 14. The stand 32 may be configured for supporting the tool 10 substantially horizontally when the tool 10 is used for aligning the fastener 12. For example, the stand 32 may have a vertical length L1 that substantially corresponds to a length L2 of the fastener 12, so that the fastener engaging structure 26 engages a top portion 13 of the fastener 12 when the tool 10 is substantially horizontally oriented. The tool may further include an alignment handle 34 attached between the second stop 22 and the second end 18 and extending substantially perpendicularly away from the shaft 14 for aiding alignment and control of the tool 10 with respect to the fastener 12. In an example embodiment, the stand 32 and alignment handle 34 may be configured in a bowtie shape and may further be configured so that the alignment handle 34 and the stand 32 may each serve the purpose of the other by rotating the shaft 180 about axis A1. In another example embodiment, the stand 32 and/or alignment handle 34 may be formed from a bent steel rod welded to the shaft 14.

Figure 3:
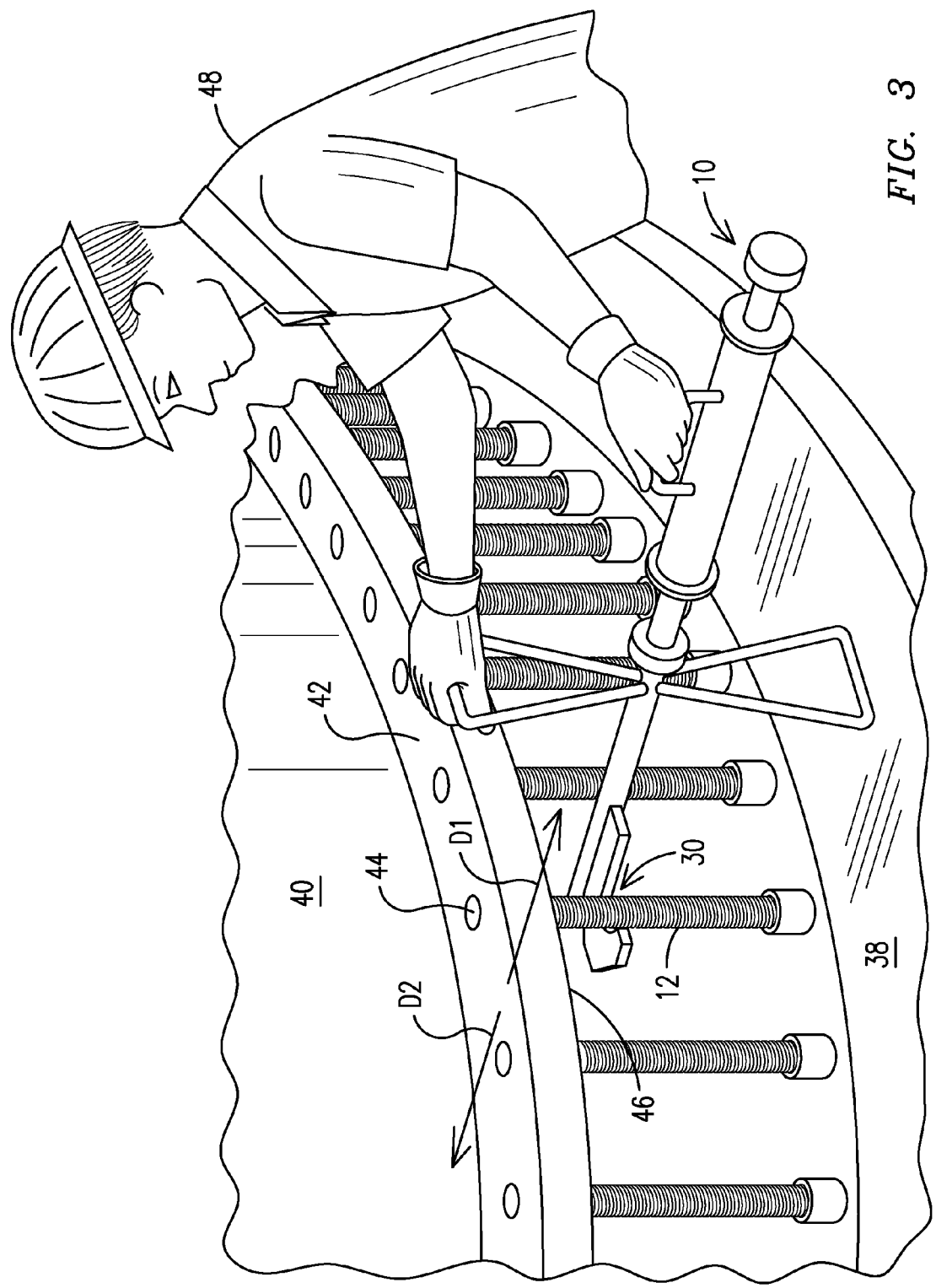
FIG. 3 is a perspective view showing how the tool of FIG. 1 may be used to align the fastener.

FIG. 3 shows how the tool 10 may be used for aligning a wind turbine tower fastener 12. A method for erecting a wind turbine tower using the tool 10 may include constructing a foundation 38 and attaching fasteners 12 to the foundation 38 in a predetermined pattern that corresponds, for example, to a hole 44 pattern in a flange 42 of a turbine tower base 40. The method may then include lowering the base 40 over the foundation 38 so that the holes 44 are aligned over the fasteners 12. Typically, one or more of the fasteners 12 may be slightly misaligned with respect to their corresponding holes 44. Consequently, the misaligned fasteners 12 may need to be urged into alignment with respect to the holes 44 to allow the wind turbine tower base 40 to slide over the fasteners 12. Accordingly, the tool 10 may be used to aid in aligning the holes 44 in the base 40 with the fasteners 12.

For example, as shown in FIG. 3, if a retainer 12 needs to be moved in an outward direction D1 to align with its respective hole 44, the hook 30 may be positioned by a user 48 to engage a portion of the retainer 12. This may be done by resting the tool on the stand 32 and outwardly moving the tool 10 until the hook 30 engages the retainer 12 as shown in FIG. 2A. When engaged, the user 48 may grasp the handle 36 and forcefully move the ram 24 towards the first end 16 against the first stop 20. The force delivered by the ram 24 acting against the first stop 20 is transferred to the hook 30 to urge the fastener 12 in outward direction D1, or towards the user 48.

Several blows of the ram 24 may need to be delivered to the first stop 20 to align the fastener 12.

Conversely, if the fastener 12 needs to be moved in an inward direction D2 to align with its respective hole 44, the notch 28 may be positioned by a user 48 to engage a portion of the retainer 12. This may be done by resting the tool 10 on the stand 32 and inwardly moving the tool 10 until the notch 28 engages the retainer 12 as shown in FIG. 2B. When engaged, the user 48 may grasp the handle 36 and move the ram 24 towards the second end 18 against the second stop 22 to urge the fastener 12 in an inward direction D2, or away from the user 48. As shown in FIG. 1, the tool 10 may be angularly aligned with respect to an axis A2 of the fastener 12 to urge the fastener 12 in a desired angular direction using the notch 28 and/or hook 30 as required.

When all the fasteners 12 are aligned with their respective holes 44, the base 40 may be further lowered over the aligned fasteners 12 to rest on the foundation 38. The base 40 may then be fastened to the foundation 38, a wind turbine tower (not shown) may be erected on the tower base, and a wind turbine (not shown) may then be installed on the tower.

While various embodiments of the present invention have been shown and described herein, it will be obvious that such embodiments are provided by way of example only. Numerous variations, changes and substitutions may be made without departing from the invention herein. For example, the tool 10 may be configured for unidirectional operation, such as for urging the fastener in one direction relative to the shaft axis A1 or urging the fastener 12 in an opposite direction relative to the shaft axis A1, respectively. Accordingly, it is intended that the invention be limited only by the spirit and scope of the appended claims.

The invention claimed is:

1. A tool for aligning a wind turbine tower fastener comprising:
   a shaft having a first end and a second end;
   a first stop disposed on the shaft proximate a first end of the shaft;
   a second stop disposed on the shaft between the first end and the second end;
   a ram reciprocally movable about the shaft between the first stop and the second stop for applying a force to the first stop and the second stop respectively;
   a fastener engaging structure disposed proximate the second end for engaging at least a portion of a fastener, said fastener engaging structure comprising a hook and a notch for transferring the force applied by the ram to at least one of the first stop and the second stop effective to urge movement of the fastener responsive to the force for aiding alignment of the fastener;
   a stand attached between the second stop and the second end and extending substantially perpendicularly away from the shaft for supporting the tool in substantially horizontal alignment when used for aligning a fastener; and
   an alignment handle attached between the second stop and the second end and extending substantially perpendicularly away from the shaft for aligning the tool with respect to the fastener;
   wherein the stand and alignment handle are together configured in a bowtie shape.

2. The tool of claim 1, further comprising a ram handle attached to the ram for allowing a user to reciprocally move the ram between the first stop and second stop.

3. The tool of claim 1, wherein the notch is sized to accommodate the portion of the fastener transferring the force applied to the second stop to the fastener.

4. The tool of claim 1, wherein the hook is sized to accommodate the portion of the fastener for transferring the force applied to the first stop to the fastener.

5. A tool for aligning a wind turbine tower fastener comprising:
   a shaft having a first end and a second end;
   a stop disposed on the shaft proximate a first end of the shaft;
   a ram reciprocally movable about the shaft between the stop and the second end for applying a force to the stop;
   a fastener engaging structure disposed proximate the second end for engaging at least a portion of the fastener and transferring the force applied by the ram to the stop effective to urge movement of the fastener responsive to the force for aiding alignment of the fastener;
   an alignment handle attached between the stop and the second end and extending substantially perpendicularly away from the shaft for aligning the tool with respect to the fastener; and
   a stand attached to the shaft opposed the alignment handle and extending substantially perpendicularly away from the shaft for supporting the tool in substantially horizontal alignment when used for aligning a fastener;
   wherein the stand and alignment handle are together configured in a bowtie shape.

6. The tool of claim 5, wherein the fastener engaging structure comprises a notch sized to accommodate the portion of the fastener transferring the force applied to the second stop to the fastener.

7. The tool of claim 5, wherein the fastener engaging structure comprises a hook sized to accommodate the portion of the fastener for transferring the force applied to the first stop to the fastener.

8. A tool for aligning a wind turbine tower fastener comprising:
   a shaft having a first end and a second end;
   a stop disposed on the shaft between the first end and the second end;
   a ram reciprocally movable about the shaft between the stop and the first end for applying a force to the stop;
   a fastener engaging structure disposed proximate the second end for engaging at least a portion of the fastener and transferring the force applied by the ram to the stop effective to urge movement of the fastener responsive to the force for aiding alignment of the fastener; and
   an alignment handle attached between the stop and the second end and extending substantially perpendicularly away from the shaft for aligning the tool with respect to the fastener; and
   a stand attached to the shaft opposed the alignment handle and extending substantially perpendicularly away from the shaft for supporting the tool in substantially horizontal alignment when used for aligning a fastener;
   wherein the stand and alignment handle are together configured in a bowtie shape.

9. The tool of claim 8, wherein the fastener engaging structure comprises a notch sized to accommodate the portion of the fastener transferring the force applied to the second stop to the fastener.

10. The tool of claim 8, wherein the fastener engaging structure comprises a hook sized to accommodate the portion of the fastener for transferring the force applied to the first stop to the fastener.

* * * * *